(12) United States Patent
Hartman et al.

(10) Patent No.: US 7,511,933 B2
(45) Date of Patent: Mar. 31, 2009

(54) SYSTEM AND METHOD FOR PROTECTING TRANSIENT-SUPPRESSING ELEMENTS AGAINST OVER-VOLTAGE CONDITIONS

(75) Inventors: Thomas C. Hartman, Coraopolis, PA (US); Bryan Marsicano, Spring Hill, FL (US); W. Marshall Mauney, West Friendship, MD (US); James I. Wise, Cranberry Township, PA (US); Michael P. King, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 97 days.

(21) Appl. No.: 11/357,226

(22) Filed: Feb. 17, 2006

(65) Prior Publication Data

US 2007/0195474 A1 Aug. 23, 2007

(51) Int. Cl.
*H02H 3/00* (2006.01)
(52) U.S. Cl. .......................................... 361/67; 361/111
(58) Field of Classification Search ................. 361/111, 361/67
See application file for complete search history.

(56) References Cited

U.S. PATENT DOCUMENTS

| | | | |
|---|---|---|---|
| 4,271,466 A | 6/1981 | Yamamoto et al. | |
| 5,153,806 A | 10/1992 | Corey | |
| 5,574,653 A * | 11/1996 | Coomer et al. | 700/286 |
| 6,584,417 B1 * | 6/2003 | Hu et al. | 702/58 |
| 6,636,409 B2 | 10/2003 | Kladar et al. | |
| 6,678,140 B2 | 1/2004 | Jakwani et al. | |
| 7,154,722 B1 * | 12/2006 | Stoupis et al. | 361/62 |
| 2001/0055186 A1 * | 12/2001 | Wodrich et al. | 361/111 |
| 2006/0146464 A1 * | 7/2006 | Tan et al. | 361/91.3 |

FOREIGN PATENT DOCUMENTS

GB 2249229 * 4/1992

* cited by examiner

*Primary Examiner*—Michael J Sherry
*Assistant Examiner*—Christopher J Clark
(74) *Attorney, Agent, or Firm*—Martin J. Moran

(57) ABSTRACT

An over-voltage protection system including a phase bus connected to a phase conductor of an electrical system and one or more transient-suppressing lines connected to the phase bus. Each of the transient-suppressing lines includes a contactor and a transient-suppressing element. The contactor of each transient-suppressing line is selectively opened and closed by a processor, thereby protecting the transient suppressing element from excessive currents. Also a method of protecting at least one transient-suppressing element from over-voltage conditions including providing a transient-suppressing line including the at least one transient-suppressing element in parallel with a load, measuring at least one of a voltage signal representative of a voltage on the transient-suppressing line and a current signal representative of a current on the transient suppressing line, and selectively placing the transient-suppressing line in either an open condition or a closed condition based on at least one of the voltage signal and the current signal.

17 Claims, 4 Drawing Sheets

SYSTEM AND METHOD FOR PROTECTING TRANSIENT-SUPPRESSING ELEMENTS AGAINST OVER-VOLTAGE CONDITIONS

BACKGROUND OF THE INVENTION

1. Field of the Invention

The present invention relates to transient voltage surge suppression systems, and in particular to a system and method for protecting transient-suppressing elements utilized in a transient voltage surge suppression system against over-voltage conditions.

2. Background Information

Electrical systems, such as an electrical power distribution system, periodically experience over-voltage conditions, such as transient over-voltage conditions, also called "surges." Over-voltage conditions are problematic to electrical systems because they may cause damage to the loads, such as an electronic device or other hardware, that are coupled thereto. As a result, transient voltage surge suppression (TVSS) systems have been developed to protect the loads from over-voltages that would otherwise damage the loads. TVSS systems typically provide such protection by coupling various types of known transient-suppressing elements between the phase, neutral and/or ground conductors of an electrical power distribution system.

As is known in the art, transient-suppressing elements, such as metal-oxide varistors (MOVs), silicon avalanche diodes (SADs) and gas tubes, typically assume a high impedance state under normal operating voltages. When the voltage across a transient-suppressing element exceeds a pre-determined threshold rating, however, the impedance of the element drops dramatically, essentially short-circuiting the electrical conductors and "shunting" the current associated with the over-voltage through the transient-suppressing element and away from the load.

MOVs are probably the most commonly used transient-suppressing elements. An MOV consists of two plates separated by an insulator, such as a metal oxide, that has a known voltage breakdown characteristic. When the voltage between the two plates reaches a certain level (the voltage breakdown level), the insulator breaks down and conducts current. MOVs, however, have operational limitations that must be taken into account when designing a TVSS system. Specifically, all MOVs have a maximum transient current rating that, if exceeded, may cause the MOV to fail. An MOV may also fail if subjected to repeated operation, even if the maximum transient current rating is never exceeded. The number of repeated operations necessary to cause failure is a function of the magnitude of transient current conducted by the MOV during each operation: the lower the magnitude, the greater the number of operations necessary to cause failure.

In light of these limitations, prior art TVSS systems have been developed that use multiple MOVs in parallel combination such that the MOVs share the total transient current. Each individual MOV in such a configuration only conducts a portion of the total transient current, making it less likely that any individual MOV will exceed its maximum transient current capacity. In addition, a TVSS system that uses a plurality of parallel MOVs can withstand a greater number of operations because of the lower magnitude of transient current conducted by each individual MOV. Moreover, a parallel combination of MOVs is advantageous because the failure of any individual MOV will not cause a complete loss of TVSS system functionality.

When an MOV fails, due to exceeding its maximum current rating or due to frequent operation, it initially falls into a low impedance state in which it draws a large steady-state current from the electrical system. This current, if not interrupted, will drive the MOV into a thermal runaway condition, typically resulting in an explosive failure of the MOV and damage to or destruction of the TVSS system as a whole. To avoid the explosive failure of MOVs in a TVSS system, appropriately-rated current-limiting elements, such as a fuse, are typically employed in series with MOVs, preferably with one such current-limiting element being in series with each MOV. Prior art TVSS systems employing multiple MOVs and one or more fuses are described in, for example, U.S. Pat. No. 5,153,806 to Corey, U.S. Pat. No. 4,271,466 to Comstock, U.S. Pat. No. 6,636,409 to Kladar et al., and U.S. Pat. No. 6,678,140 to Jakwani et al.

The problem with using fuses to protect against MOV failure is that fuses, while effective in many conditions, are not reliable over the full range of fault currents that may occur. In particular, a fuse may open in response to certain over-current conditions (resulting from an over-voltage) that would not be a problem for (i.e., cause the failure of) the associated MOV. Such fuses are commonly referred to as "nuisance fuses" (having been opened under a condition that was not necessary to protect the MOV) and must be replaced, which is both expensive and inconvenient. Thus there is a need for a system for protecting transient-suppressing elements, such as MOVs, employed in a TVSS system from over-voltage conditions (and the over-currents that result therefrom) that is reliable over the full range of over-currents that may occur.

SUMMARY OF THE INVENTION

These needs, and others, are addressed by the present invention which provides a system for protecting a load connected to an electrical system from over-voltage conditions. The system includes a phase bus connected to a phase conductor of the electrical system and one or more transient-suppressing lines connected to the phase bus. Each of the transient-suppressing lines includes a contactor and a transient-suppressing element, such as an MOV, connected in series with the contactor. The system further includes a processing unit and a memory storing one or more routines executable by the processing unit. The contactor of each transient-suppressing line is in electronic communication with the processing unit, and the routines are adapted to selectively open and close each contactor, thereby protecting the associated transient suppressing element from excessive currents.

In the preferred embodiment, each of the transient-suppressing lines has operatively coupled thereto at least one of: (i) a voltage transducer in electronic communication with the processing unit, the voltage transducer generating a voltage signal, and (ii) a current transducer in electronic communication with the processing unit, the current transducer generating a current signal. In this embodiment, the routines are further adapted to selectively open and close each contactor based on at least one of the associated voltage signal and the associated current signal. The memory may store one or both of a normal voltage signature and a normal current signature for each of the transient-suppressing lines. The routines may then be further adapted to open and close each contactor based on at least one of: (i) a first comparison between the associated voltage signal and the normal voltage signature, and (ii) a second comparison between the associated current signal and the normal current signature. In particular, the contactor will be opened is abnormal voltage and/or current conditions are detected.

Moreover, the phase bus may include a phase bus contactor in electronic communication with the processing unit, wherein the routines are further adapted to selectively open and close the phase bus contactor. In particular, the phase bus may have operatively coupled thereto at least one of: (i) a phase bus voltage transducer in electronic communication with the processing unit, the phase bus voltage transducer generating a phase bus voltage signal, and (ii) a phase bus current transducer in electronic communication with the processing unit, the phase bus current transducer generating a phase bus current signal. In this configuration, the routines are further adapted to open and close the phase bus contactor based on at least one of the phase bus voltage signal and the phase bus current signal, such as by comparing those signals normal signatures to detect abnormalities.

According to another aspect of the invention, a phase conductor voltage transducer generating a phase conductor voltage signal is operatively coupled to the phase conductor and in electronic communication with said processing unit. The phase bus contactor is in a normally open condition, and the routines are adapted to close the phase bus contactor only if the phase conductor voltage signal is determined to be at or below a predetermined level.

According to yet another aspect of the invention, at least one of the transient-suppressing lines includes a parallel combination of a series contactor and a series transient-suppressing element which is connected in series with the transient-suppressing element of the transient-suppressing lines. The routines are adapted to selectively open and close said series contactor in order to provide greater voltage handling capability.

The invention also relates to a method of protecting at least one transient-suppressing element from over-voltage conditions, wherein the at least one transient suppressing element is part of a system for protecting a load connected to an electrical system. The method includes providing a transient-suppressing line including the at least one transient-suppressing element, the transient-suppressing line being connected to the electrical system and being in parallel with the load, measuring at least one of a voltage signal representative of a voltage on the transient-suppressing line and a current signal representative of a current on the transient suppressing line, and selectively placing the transient-suppressing line in either an open, non-conducting condition or a closed, conducting condition based on at least one of the voltage signal and the current signal. As a result, the transient-suppressing element is protected form damaging over-voltage conditions.

In one particular embodiment, the method includes storing one or both of a normal voltage signature and a normal current signature for the transient-suppressing line, and performing at least one of: (i) a first comparison between the voltage signal and the normal voltage signature, and (ii) a second comparison between the current signal and the normal current signature. In this embodiment, the step of selectively placing the transient-suppressing line in either an open, non-conducting condition or a closed, conducting condition is based on at least one of the first comparison and the second comparison.

Where the transient-suppressing line is connected to a phase bus connected to a phase conductor of the electrical system, the method may include measuring at least one of a phase bus voltage signal representative of a voltage on the phase bus and a phase bus current signal representative of a current on the phase bus, and selectively placing the phase bus in either an open, non-conducting condition or a closed, conducting condition based on at least one of said phase bus voltage signal and said phase bus current signal. The decision to place the phase bus in either an open, non-conducting condition or a closed, conducting condition may be based on a comparison to normal voltage and current signatures to detect abnormal conditions. In addition, the method, according to another aspect of the invention, may include connecting the phase bus to a phase conductor of the electrical system only if a phase voltage on the phase conductor is determined to be at or below a predetermined level. Finally, the method may include selectively connecting at least one additional transient-suppressing element in series with the at least one transient-suppressing element to increase the voltage handling capacity.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
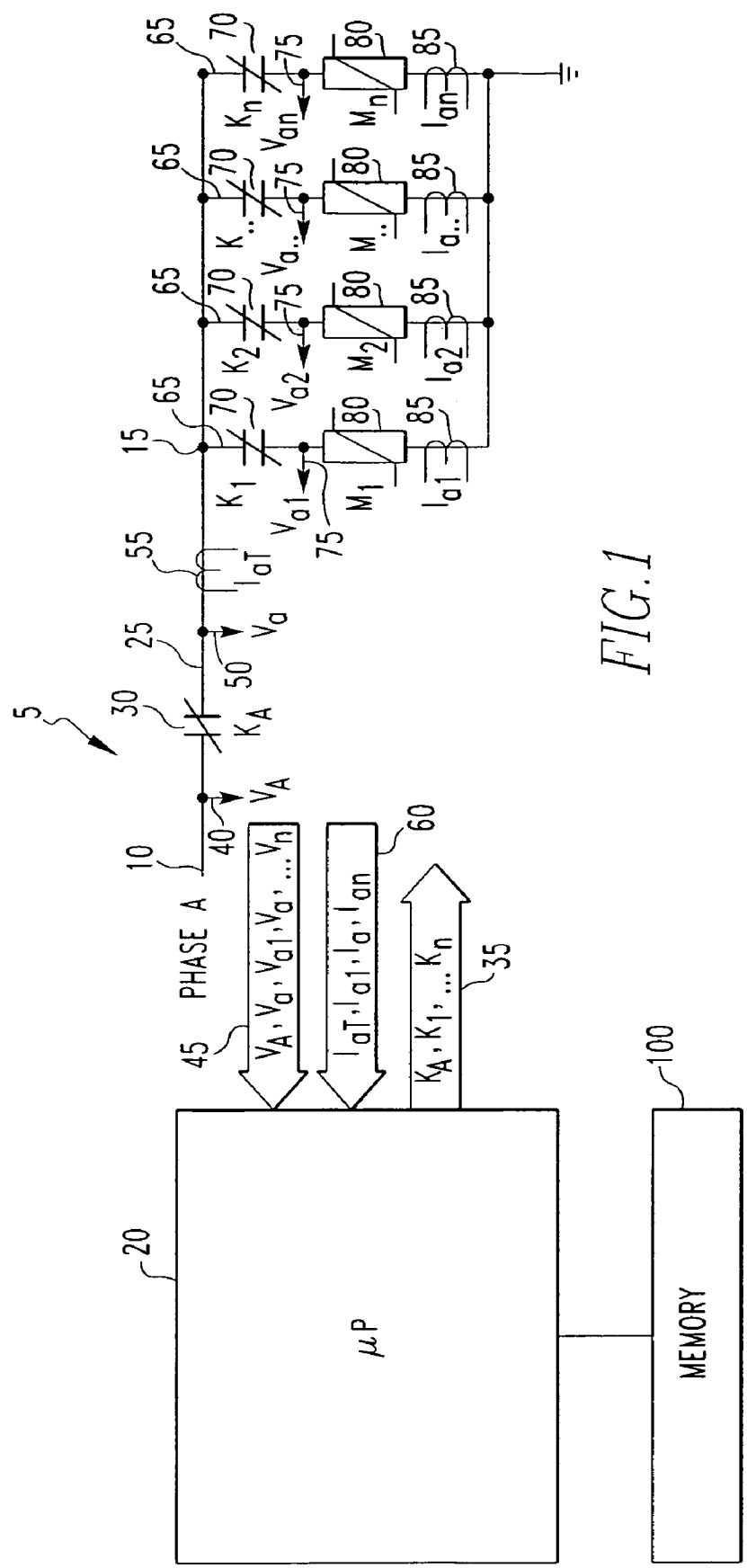
FIG. 1 is a schematic diagram of a TVSS system according to one embodiment of the present invention.

FIG. 1 is a schematic diagram of a TVSS system 5 according to one embodiment of the present invention. TVSS system 5 is coupled to a phase conductor 10, designated as Phase A, which is a phase conductor of an electrical power distribution system. Phase conductor 10 may be the sole phase conductor of a single phase electrical power distribution system, or one phase conductor of a multi-phase electrical power distribution system, such as, for example, a three-phase electrical power distribution system. TVSS system 5 includes TVSS circuit 15 in electronic communication with processing unit 20, which may be, for instance, and without limitation, a microprocessor (µP). As seen in FIG. 1, TVSS circuit 15 includes phase bus 25 that is selectively connectable to phase conductor 10 by way of contactor 30. Contactor 30 may be any type of known electronically controlled switch or relay, such as a TRIAC or an SCR (silicon controlled rectifier). Contactor 30, identified as $K_A$ in FIG. 1, is in electronic communication with and under the control of processing unit 20, which is able to selectively open and close contactor 30 using appropriate electronic signals represented by arrow 35 in FIG. 1.

In addition, a voltage transducer 40, such as, for example, a potential transformer or similar voltage measuring device, is operatively coupled to phase conductor 10 and is in electronic communication with processing unit 20. Voltage transducer 40 generates a signal $V_A$ which represents the voltage carried by phase conductor 10 (the source voltage). The $V_A$ signal is transmitted to processing unit 20 as indicated by the arrow 45 in FIG. 1. A voltage transducer 50 is operatively coupled to phase bus 25 and is in electronic communication with processing unit 20. Voltage transducer 50 generates a signal $V_a$ which represents the voltage carried by phase bus 25. A current transducer 55, such as, for example, a current transformer, a Hall Effect device or any other suitable current measuring device, is also operatively coupled to phase bus 25 and is in electronic communication with processing unit 20. Current transducer 55 generates a signal $I_{aT}$ which represents the total current carried by phase bus 25. The $V_a$ and $I_{aT}$ signals are transmitted to processing unit 20 as indicated by arrows 45 and 60, respectively, in FIG. 1.

TVSS circuit 15 also includes a plurality of transient-suppressing lines 65 arranged in a parallel configuration as seen in FIG. 1. Each transient-suppressing line 65 is connected to phase bus 25 at a first end thereof and to ground at a second end thereof. Transient-suppressing lines 65 are also connected in parallel with a load that is to be protected. Furthermore, each transient-suppressing line 65 includes a contactor 70 as described above (identified as $K_1, K_2 \ldots K_n$) and a transient-suppressing element 80, which preferably is an MOV (identified as $M_1, M_2 \ldots M_n$), but may be another type of known transient-suppressing element. In addition, a voltage transducer 75 as described above and a current transducer 85 as described above are operatively coupled to each transient-suppressing line 65. Each contactor 70, voltage transducer 75, and current transducer 85 is in electronic communication with processing unit 20. Processing unit 20, through appropriate electronic signals represented by arrow 35, selectively controls the operation of (opening and closing) each contactor 70. Each voltage transducer 75 generates a signal ($V_{a1}, V_{a2} \ldots V_{an}$) which represents the voltage carried by the associated transient-suppressing line 65 (arrow 45), and each current transducer 85 generates a signal ($I_{a1}, I_{a2} \ldots I_{an}$) which represents the current carried by the associated transient-suppressing line 65 (arrow 60). Those signals are communicated to processing unit 20 for processing thereby.

Figure 2:
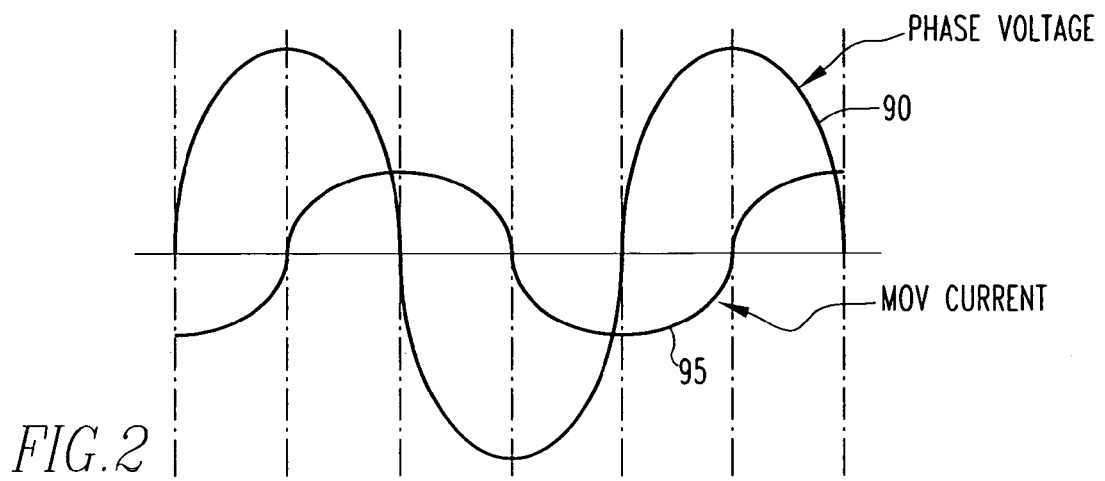
FIGS. 2, 3 and 4 are graphical representations of sample normal and abnormal voltage and current signatures that may be measured using the TVSS system of FIG. 1.
Figure 3:
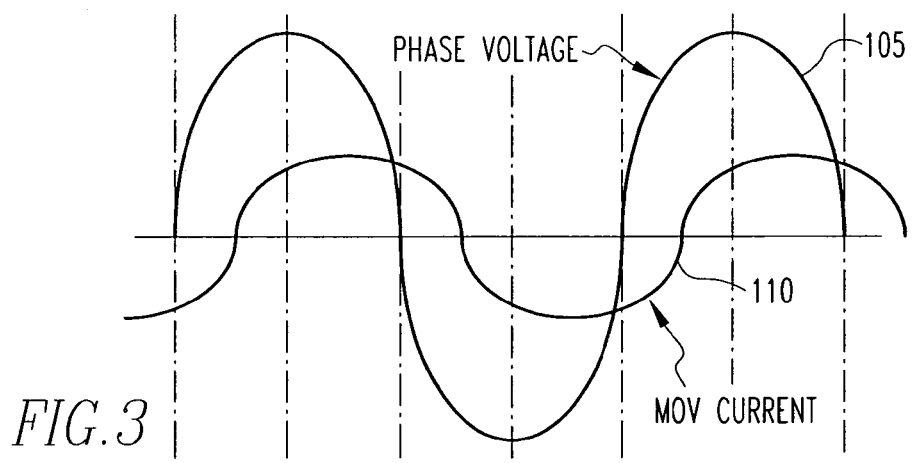
Figure 4:
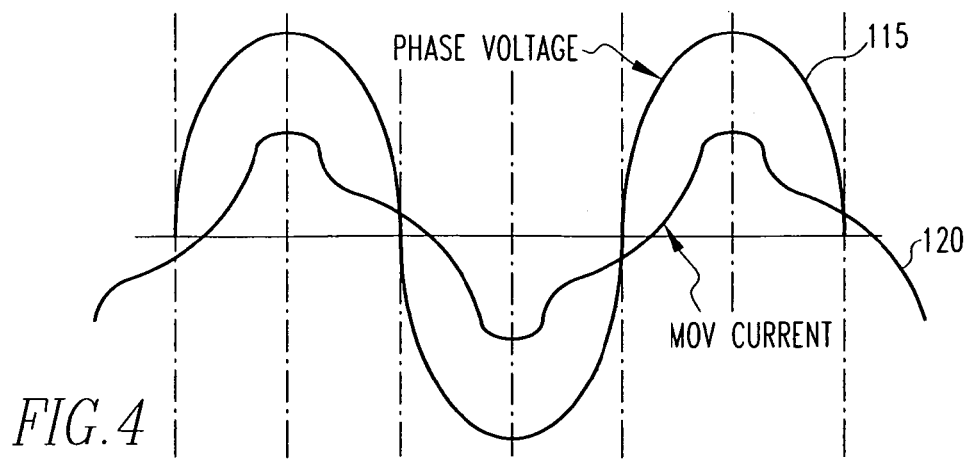

Signals $V_A, V_a, V_{a1}, V_{a2} \ldots V_{an}$ and $I_{aT}, I_{a1}, I_{a2} \ldots I_{an}$ not only provide information about a particular voltage or current level at a particular time, but also provide information and representations of the AC voltage and current waveforms that are present at each particular location in TVSS circuit 15. In addition, as is known in the art, under normal, safe operating conditions, TVSS circuit 15 will have a consistent "normal" voltage signature (AC waveform) and a consistent "normal" current signature (AC waveform) at each location where signals $V_a, V_{a1}, V_{a2} \ldots V_{an}$ and $I_{aT}, I_{a1}, I_{a2} \ldots I_{an}$ are measured. FIG. 2 shows an example of a normal voltage signature 90 and a normal current signature 95 measured at, for example, the locations where $V_{a1}$ and $I_{a1}$ are measured. These signatures may be measured, recorded and stored in, for example, a memory 100 associated with processing unit 100 for use by processing unit 20 as described herein. Memory 100 may be one or more of any type of known storage element such as RAM, ROM, PROM and the like, alone or in combination. For example, memory 100 could be a combination of a RAM component and a ROM component. Under abnormal operating conditions, such as an over-voltage condition, the voltage signature and/or current signature at one or more of the locations where signals $V_a, V_{a1}, V_{a2} \ldots V_{an}$ and $I_{aT}, I_{a1}, I_{a2} \ldots I_{an}$ are measured will differ from the normal current and/or voltage signature for that location. FIGS. 3 and 4 show two examples of a voltage signature (105 and 115) and a current signature (110 and 120) measured at the locations where $V_{a1}$ and $I_{a1}$ are measured under an abnormal operating condition, such as an over-voltage condition. Current signature 110 presents a phase shift as compared to normal current signature 95 due to microstructure damage of the associated transient-suppressing element 80 (e.g., MOV $M_1$) resulting from excessive joule heating. Similarly, current signature 120 presents a phase shift as compared to normal current signature 95 due to an over-voltage condition in the associated transient-suppressing line 65.

According to an aspect of the present invention, memory 100 is provided with one or more software routines executable by processing unit 20 for receiving the voltage and/or current signatures represented by signals $V_a, V_{a1}, V_{a2} \ldots V_{an}$ and $I_{aT}, I_{a1}, I_{a2} \ldots I_{an}$ and comparing them to the pre-stored normal voltage signature and normal current signature for the appropriate location within TVSS circuit 15. Based on these comparisons, if one or more abnormal signatures are detected, processing unit 20 will generate and transmit an appropriate signal for opening the associated contact 70 to thereby protect the associated transient-suppressing element 80 from further exposure to a harmful voltage and/or current condition. As a result, damage, possibly catastrophic, to the TVSS circuit 15 as a whole will likely be prevented, with only the associated transient-suppressing element or elements 80 possibly needing to be replaced. As will be appreciated, under some circumstances, it will be advantageous to open contactor 30 to isolate TVSS circuit 15 (and protect all elements thereof) in its entirety until normal operating conditions are restored.

According to a further aspect of the invention, when operation of TVSS circuit 15 is first initiated in a particular application, contactor 30 begins in a normally open condition, thereby isolating TVSS circuit 15. Processing unit 20 will then monitor signal $V_A$ to determine whether it is within a predetermined normal operating range for TVSS circuit 15, and will only generate a signal to close contactor 30 if it is determined that the signal $V_A$ is within the normal operating range.

Figure 5:
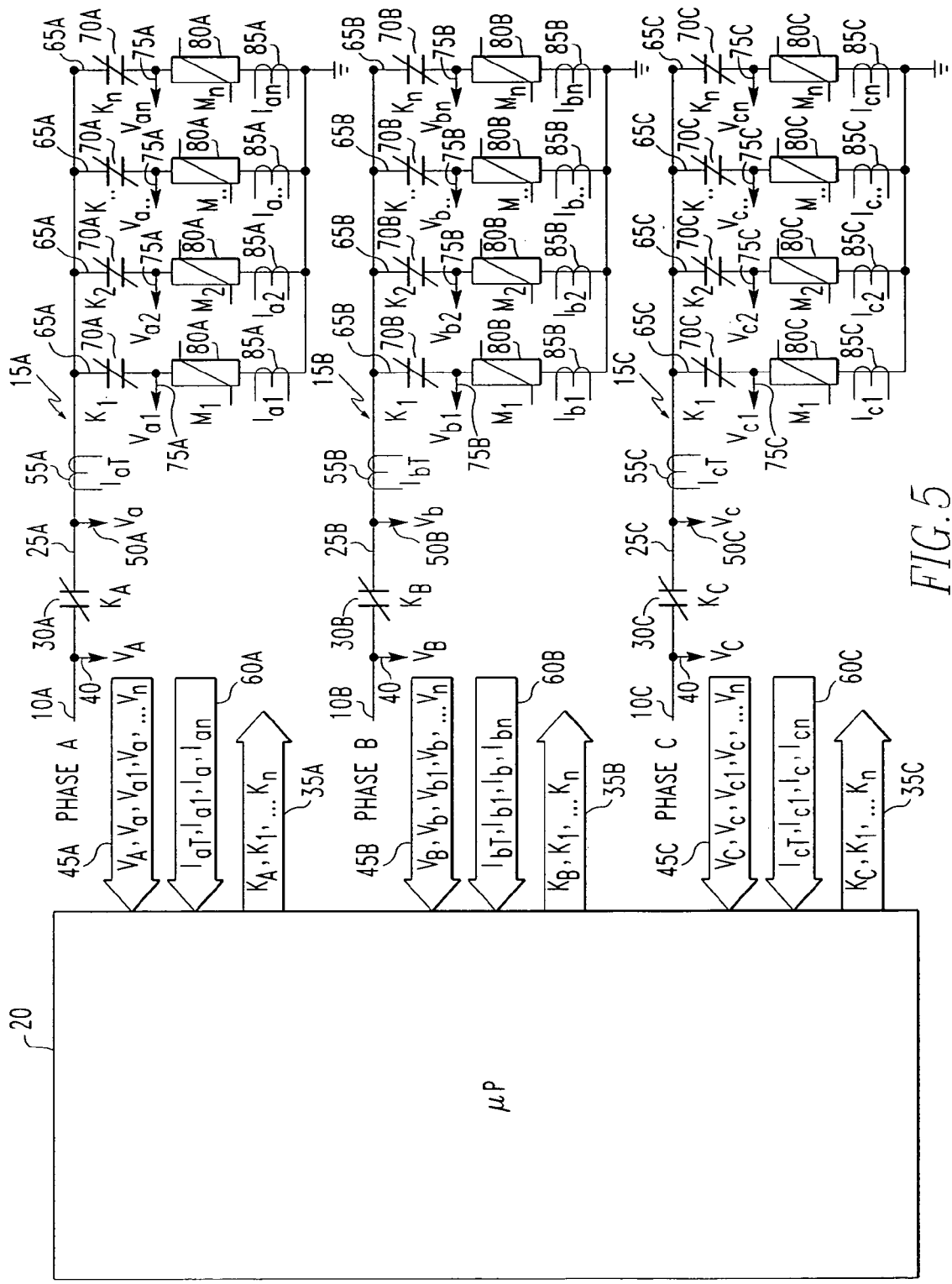
FIG. 5 is a schematic diagram that illustrates application of TVSS system of FIG. 1 to a three-phase electrical distribution system.

FIG. 5 illustrates the application of the present invention to a three-phase electrical distribution system having Phases A, B, and C. As seen in FIG. 5, three TVSS circuits 15 as described above are provided, one for each of the Phases A, B and C. Processing unit 20 in this configuration is adapted to independently monitor each TVSS circuit 15 and take appropriate action as described above in connection with FIGS. 1-4.

Figure 6:
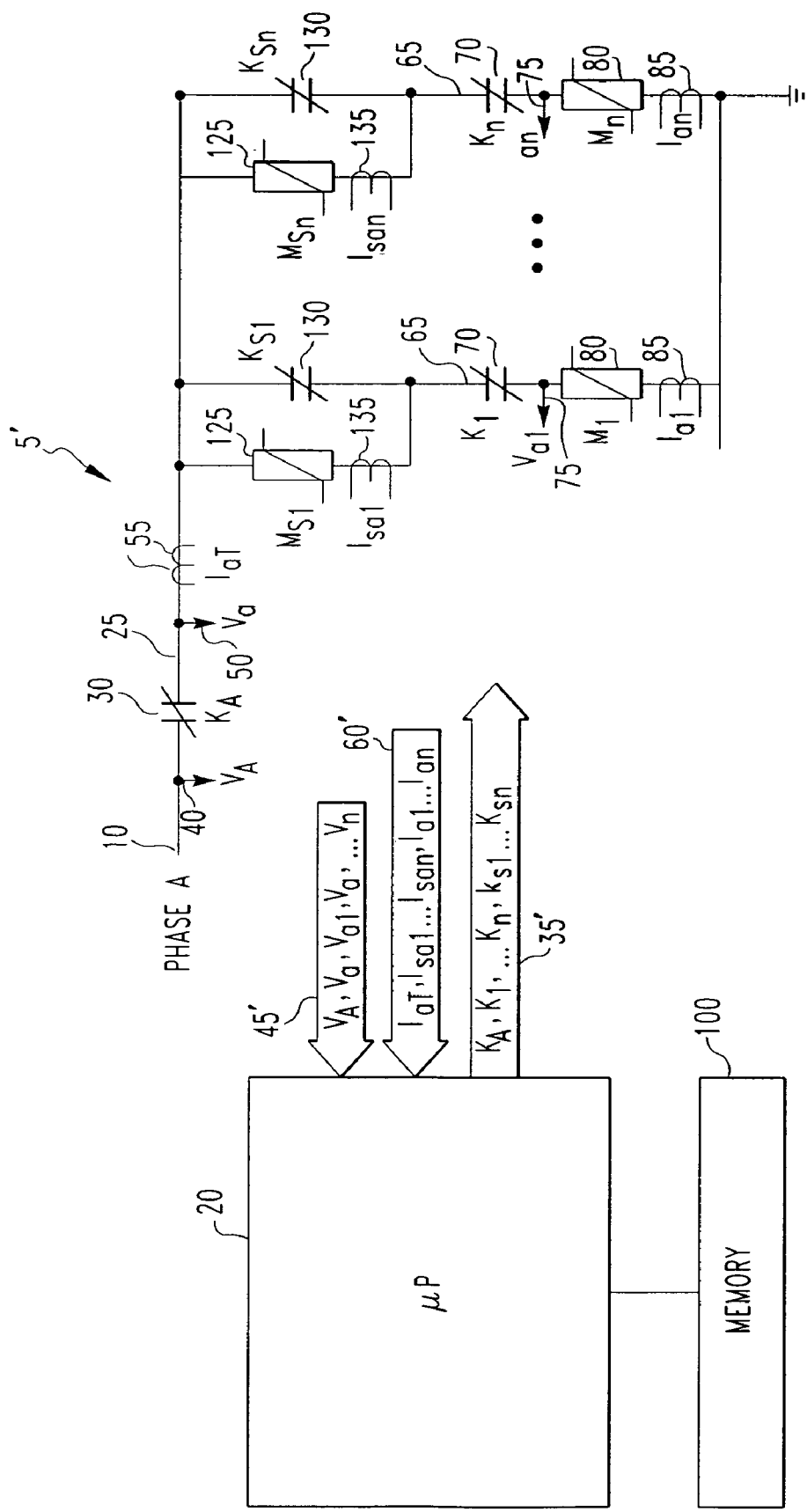
FIG. 6 is a schematic diagram of a TVSS system according to an alternate embodiment the present invention.

FIG. 6 is a schematic diagram of a TVSS system 5' according to an alternate embodiment of the present invention. As described below, TVSS system 5' includes one or more additional series transient-suppressing elements that may be selectively switched in and out to provide increased operating voltage capability. TVSS system 5' includes all of the elements of TVSS system 5 described above, and such elements are designated with like reference numerals in FIG. 6.

As seen in FIG. 6, one or more of the transient-suppressing lines 65 in TVSS system 5' include, in series with the other elements thereof, a parallel combination of a series transient-suppressing element 125 (identified as $M_{s1} \ldots M_{sn}$) and a series contactor 130 (identified as $K_{s1} \ldots K_{sn}$). In addition, a series current transducer 135 is operatively coupled to the line containing each series transient-suppressing element 125 to provide a signal ($I_{sa1} \ldots I_{san}$) representative of the current flowing through the series transient-suppressing element 125. Each series contactor 130 is in electronic communication with and under the selective control of processing unit 20 (represented by arrow 35'). Similarly, each series current transducer 135 is in electronic communication with processing unit 20 (represented by arrow 60'). If a series contactor 130 is in a closed condition, then the associated series transient-suppressing element 125 will be by-passed. If, however, a series contactor 130 is in an open condition, then the associated series transient-suppressing element 125 will be placed in series with the associated transient-suppressing element 80, thereby increasing the voltage level that the transient-suppressing line 65 can handle. In this embodiment, memory 100 is provided with one or more routines for selectively opening and closing series contactors 130 when it would be desirable to increase the voltage that a particular transient-suppressing line 65 can handle.

Thus, the present invention provides a system and method of providing transient voltage surge suppression in which the transient-suppressing elements that are utilized are protected over a full range of over-current conditions yet remain functional for all over-voltage conditions that they can appropriately handle (that may otherwise have caused a fuse to open).

While specific embodiments of the invention have been described in detail, it will be appreciated by those skilled in the art of various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system for protecting a load connected to an electrical system from over-voltage conditions, comprising:
    a phase bus connected to a phase conductor of said electrical system;
    one or more transient-suppressing lines connected to said phase bus, each of said one or more transient-suppressing lines including a contactor and a transient-suppressing element connected in series with said contactor;
    a processing unit, the contactor of each of said one or more transient-suppressing lines being in electronic communication with said processing unit;
    a memory storing one or more routines executable by said processing unit, said one or more routines being adapted to selectively open and close the contactor of each of said one or more transient-suppressing lines; and
    wherein each of said one or more transient-suppressing lines has operatively coupled thereto at least one of: (i) a voltage transducer in electronic communication with said processing unit, said voltage transducer generating an AC waveform voltage signal, and (ii) a current transducer in electronic communication with said processing unit, said current transducer generating an AC waveform current signal, wherein said memory stores one or both of a normal AC waveform voltage signature and a normal AC waveform current signature for each of said one or more transient-suppressing lines, and wherein said one or more routines are further adapted to open and close the contactor of each one of said one or more transient-suppressing lines based on at least one of: (i) a first comparison between the AC waveform voltage signal generated by the voltage transducer of the one of said one or more transient-suppressing lines and said normal AC waveform voltage signature, and (ii) a second comparison between the AC waveform current signal generated by the current transducer of the one of said one or more transient-suppressing lines and said normal AC waveform current signature.

2. The system according to claim 1, wherein said one or more routines are adapted to open the contactor of each one of said one or more transient-suppressing lines if at least one of: (i) said AC waveform voltage signal of the one of said one or more transient-suppressing lines is determined to be abnormal based on the first comparison associated with the one of said one or more transient-suppressing lines, and (ii) said AC waveform current signal of the one of said one or more transient-suppressing lines is determined to be abnormal based on the second comparison associated with the one of said one or more transient-suppressing lines.

3. The system according to claim 1, wherein said voltage transducer operatively coupled to each of said one or more transient-suppressing lines is a potential transformer.

4. The system according to claim 1, wherein said current transducer operatively coupled to each of said one or more transient-suppressing lines is a current transformer.

5. The system according to claim 1, wherein said phase bus includes a phase bus contactor in electronic communication with said processing unit, and wherein said one or more routines are further adapted to selectively open and close the phase bus contactor.

6. The system according to claim 5, wherein said phase bus has operatively coupled thereto at least one of: (i) a phase bus voltage transducer in electronic communication with said processing unit, said phase bus voltage transducer generating a phase bus voltage signal, and (ii) a phase bus current transducer in electronic communication with said processing unit, said phase bus current transducer generating a phase bus current signal, wherein said one or more routines are further adapted to open and close said phase bus contactor based on at least one of said phase bus voltage signal and said phase bus current signal.

7. The system according to claim 6, wherein said phase bus voltage signal is an AC waveform phase bus voltage signal, wherein said phase bus current signal is an AC waveform phase bus current signal, wherein said memory stores one or both of a normal phase bus AC waveform voltage signature and a normal phase bus AC waveform current signature, and wherein said one or more routines are further adapted to open and close the phase bus contactor based on at least one of: (i) a first comparison between said phase bus AC waveform voltage signal and said normal phase bus AC waveform voltage signature, and (ii) a second comparison between said phase bus AC waveform current signal and said normal phase bus AC waveform current signature.

8. The system according to claim 7, wherein said one or more routines are further adapted to open said phase bus contactor if at least one of: (i) said phase bus AC waveform voltage signal is determined to be abnormal based on the first comparison, and (ii) said phase bus AC waveform current signal is determined to be abnormal based on the second comparison.

9. The system according to claim 5, wherein a phase conductor voltage transducer generating a phase conductor voltage signal is operatively coupled to said phase conductor and in electronic communication with said processing unit, wherein said phase bus contactor is in a normally open condition, and wherein said one or more routines are further adapted to close said phase bus contactor only if said phase conductor voltage signal is determined to be at or below a predetermined level.

10. A system for protecting a load connected to an electrical system from over-voltage conditions, comprising:
    a phase bus connected to a phase conductor of said electrical system;
    one or more transient-suppressing lines connected to said phase bus, each of said one or more transient-suppressing lines including a contactor and a transient-suppressing element connected in series with said contactor;
    a processing unit, the contactor of each of said one or more transient-suppressing lines being in electronic communication with said processing unit;
    a memory storing one or more routines executable by said processing unit, said one or more routines being adapted to selectively open and close the contactor of each of said one or more transient-suppressing lines; and wherein at least one of said transient-suppressing lines includes a parallel combination of a series contactor and a series transient-suppressing element, said parallel combination being connected in series with the transient-suppressing element of said at least one of said transient-suppressing lines, and wherein said one or more routines are further adapted to selectively open and close said series contactor.

11. A method of protecting at least one transient-suppressing element from over-voltage conditions, said at least one transient suppressing element being part of a system for protecting a load connected to an electrical system, comprising:
providing a transient-suppressing line including said at least one transient-suppressing element, said transient-suppressing line being connected to said electrical system and being in parallel with said load;
measuring at least one of a voltage signal representative of a voltage on said transient-suppressing line and a current signal representative of a current on said transient-suppressing line, wherein said voltage signal is an AC waveform voltage signal and said current signal is an AC waveform current signal;
storing one or both of a normal AC waveform voltage signature and a normal AC waveform current signature for said transient-suppressing line;
performing at least one of: (i) a first comparison between said AC waveform voltage signal and said normal AC waveform voltage signature, and (ii) a second comparison between said AC waveform current signal and said normal AC waveform current signature; and
selectively placing said transient-suppressing line in either an open, non-conducting condition or a closed, conducting condition based on at least one of said first comparison and said second comparison.

12. The method according to claim 11, wherein said transient-suppressing line is placed in said open, non-conducting condition if either said AC waveform voltage signal is determined to be abnormal based on said first comparison or said AC waveform current signal is determined to be abnormal based on said second comparison.

13. The method of claim 11, wherein said transient-suppressing line is connected to a phase bus connected to a phase conductor of said electrical system, said method further comprising: measuring at least one of a phase bus voltage signal representative of a voltage on said phase bus and a phase bus current signal representative of a current on said phase bus; and selectively placing said phase bus in either an open, non-conducting condition or a closed, conducting condition based on at least one of said phase bus voltage signal and said phase bus current signal.

14. The method according to claim 13, wherein said phase bus voltage signal is an AC waveform phase bus voltage signal, wherein said phase bus current signal is an AC waveform phase bus current signal, the method further comprising storing one or both of a normal phase bus AC waveform voltage signature and a normal phase bus AC waveform current signature; and performing at least one of: (i) a first phase bus comparison between said phase bus AC waveform voltage signal and said normal phase bus AC waveform voltage signature, and (ii) a second phase bus comparison between said phase bus AC waveform current signal and said normal phase bus AC waveform current signature; wherein said phase bus is placed in either an open, non-conducting condition or a closed, conducing condition based on at least one of said first comparison and said second comparison.

15. The method according to claim 11, wherein said transient-suppressing line is connected to a phase bus, the method further comprising electrically connecting said phase bus to a phase conductor of said electrical system only if a phase voltage on said phase conductor is determined to be at or below a predetermined level.

16. The method of claim 11, wherein said transient-suppressing line is connected to a phase bus connected to a phase conductor of said electrical system, said method further comprising: measuring at least one of a phase bus voltage signal representative of a voltage on said phase bus and a phase bus current signal representative of a current on said phase bus; wherein the step of selectively placing said transient-suppressing line in either an open, non-conducting condition or a closed, conducting condition is based on at least one of said voltage signal, said current signal, said phase bus voltage signal and said phase bus current signal.

17. A method of protecting at least one transient-suppressing element from over-voltage conditions, said at least one transient suppressing element being part of a system for protecting a load connected to an electrical system, comprising:
providing a transient-suppressing line including said at least one transient-suppressing element, said transient-suppressing line being connected to said electrical system and being in parallel with said load;
measuring at least one of a voltage signal representative of a voltage on said transient-suppressing line and a current signal representative of a current on said transient suppressing line, wherein said voltage signal is an AC waveform voltage signal and said current signal is an AC waveform current signal;
storing one or both of a normal AC waveform voltage signature and a normal AC waveform current signature for said transient-suppressing line;
performing at least one of: (i) a first comparison between said AC waveform voltage signal and said normal AC waveform voltage signature, and (ii) a second comparison between said AC waveform current signal and said normal AC waveform current signature;
selectively placing said transient-suppressing line in either an open, non-conducting condition or a closed, conducting condition based on at least one of said first comparison and said second comparison; and
wherein said transient-suppressing line is connected to a phase bus connected to a phase conductor of said electrical system, said method further comprising: measuring at least one of a phase bus voltage signal representative of a voltage on said phase bus and a phase bus current signal representative of a current on said phase bus; wherein the step of selectively placing said transient-suppressing line in either an open, non-conducting condition or a closed, conducting condition is based on at least one of said voltage signal, said current signal, said phase bus voltage signal and said phase bus current signal.

* * * * *